Nov. 25, 1924.
J. L. ANDERSON
WELDING TORCH
Filed Aug. 13, 1919
1,516,486
2 Sheets-Sheet 1
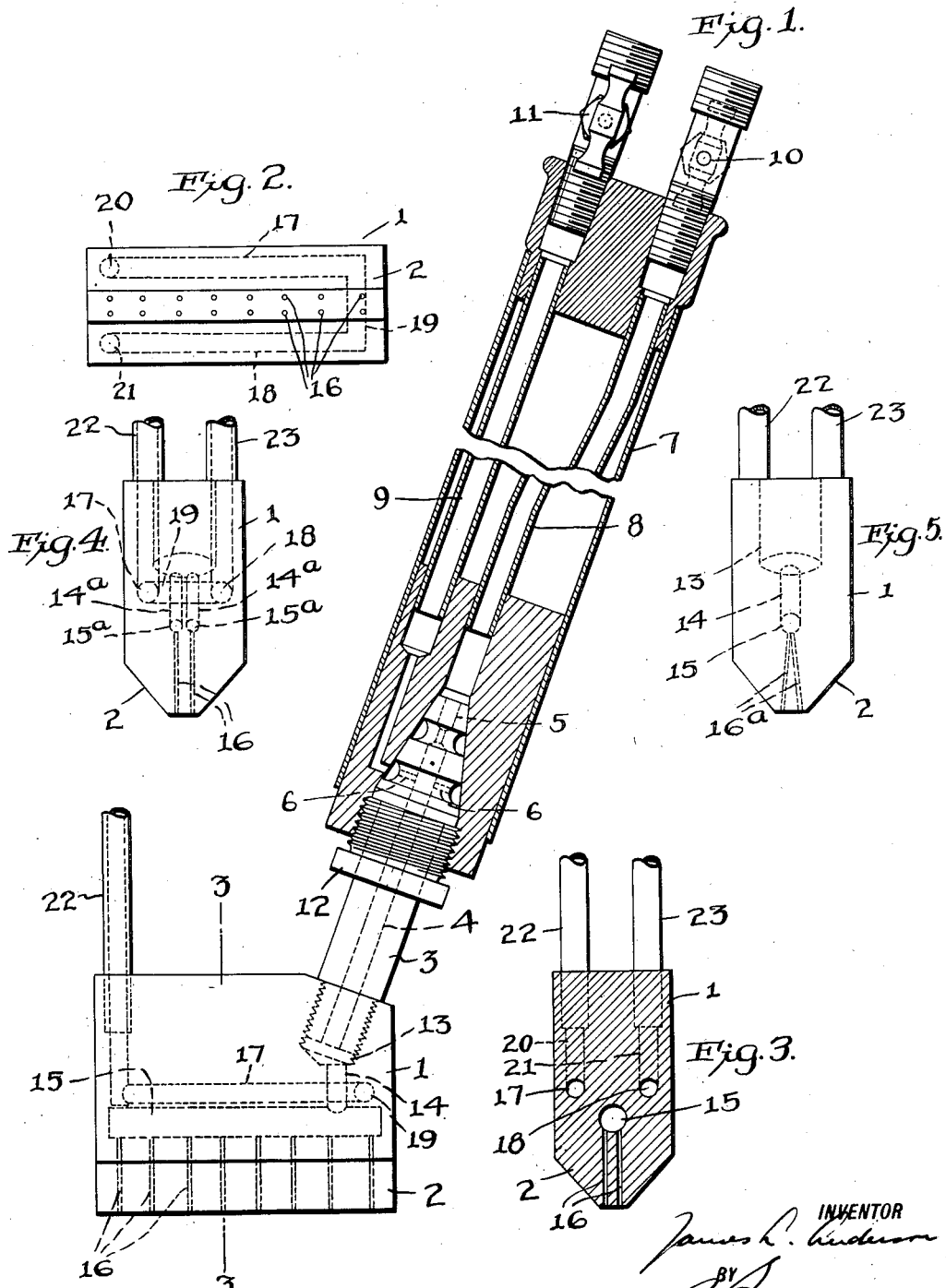

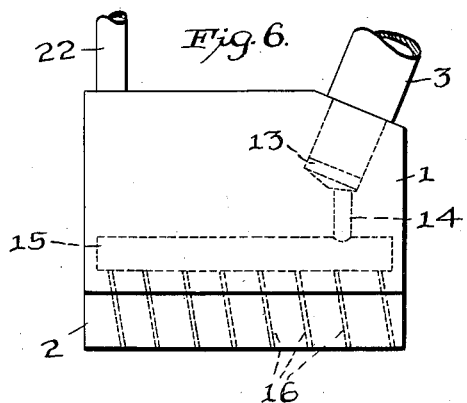
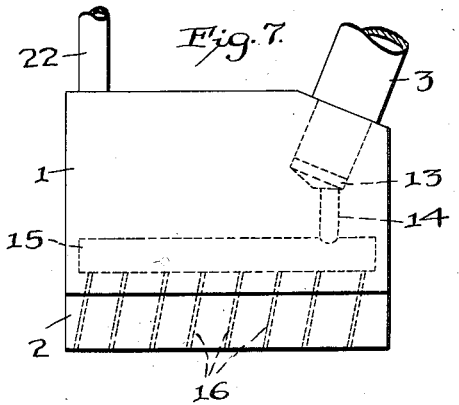
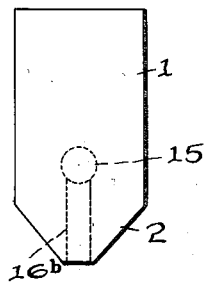
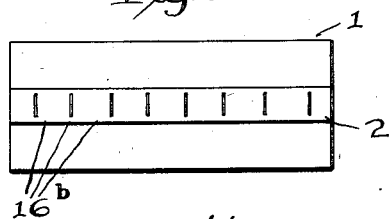
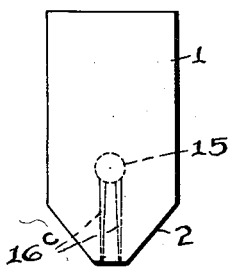
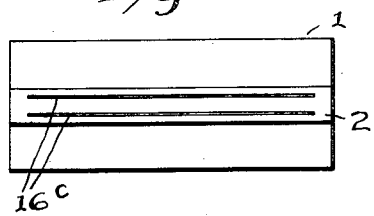
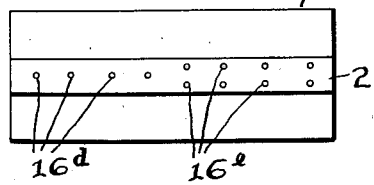
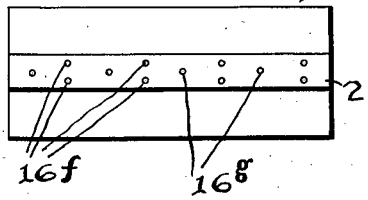
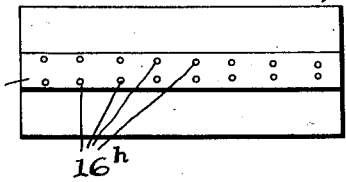

Patented Nov. 25, 1924.

1,516,486

UNITED STATES PATENT OFFICE.

JAMES L. ANDERSON, OF BAYONNE, NEW JERSEY, ASSIGNOR, BY MESNE ASSIGNMENTS, TO AIR REDUCTION COMPANY, INCORPORATED, OF NEW YORK, N. Y., A CORPORATION OF NEW YORK.

WELDING TORCH.

Application filed August 13, 1919. Serial No. 317,282.

*To all whom it may concern:*

Be it known that I, JAMES L. ANDERSON, a citizen of the United States, and resident of Bayonne, in the county of Hudson and State of New Jersey, have invented a new and useful Welding Torch, of which the following is a specification.

The invention relates to oxyacetylene or like torches for machines for autogenously welding the longitudinal seams of tubing, sheets or plates, wherein the torch and work are supported in definite relation and one driven relatively to the other in the direction of the length of the seam. The object is to provide a torch whereby increased speed of welding and a better weld may be obtained, and whereby more efficient use may be made of the flame. These results are attained by a torch in which the heating is both extended lengthwise and spread transversely across the seam, by means of double or multiple adjacent rows of jet passages supplied from a suitable mixer. Double or multiple slits may also be used in place of the rows of holes. In some cases a single row of jet apertures, or slit, in one part of the burner, may be combined with double or multiple rows in another part, or double and single holes may alternate or be disposed in other combinations, or rows or slits may be arranged convergingly or divergingly, or still other arrangements may be made; but in any case the jets closely straddle or span the seam, so as to secure improved results, and with economical consumption of gases measured by the output of the machine. As set forth in my copending application for method of welding, Serial No. 317,281, filed August 13, 1919, the distribution of the flame at opposite sides of the longitudinal line of the weld avoids loss of working heat and possible formation of holes by the active cones striking through the seam, and causes the welding to be produced principally by radiation and conduction, while the envelope is more advantageously employed than heretofore, both by filling the interior and surrounding the exterior of the tube with diffused preheating flame.

In the accompanying drawings illustrating certain embodiments of the invention:

Fig. 1 is a view, partly in side elevation and partly in vertical section, of a torch embodying the invention;

Fig. 2 is a bottom plan of the tip;

Fig. 3 is a vertical cross-section through the tip on the line 3—3 of Fig. 1;

Fig. 4 is an end elevation of the tip;

Fig. 5 is an end elevation of a modified form of tip;

Figs. 6 and 7 are side elevations of further modifications;

Fig. 8 is an end elevation of another modification;

Fig. 9 is a bottom plan thereof;

Figs. 10 and 11 are views in end elevation and bottom plan, respectively, of a slotted tip; and Figs. 12, 13 and 14 are bottom plan views of still other forms of tip embodying the invention.

The torch tip of Figs. 1 to 3 comprises an oblong, horizontally elongated, vertically deep and laterally flattened block 1, having a laterally tapered, horizontally extending nozzle portion 2 at the bottom. Terms of orientation are, of course, relative, though the torch will usually be used in the position shown, or possibly inverted. A mixer stem 3, preferably inclined, is inserted into an upper corner portion of the block. This stem has a longitudinal passage 4, with oxygen and acetylene inlet ports 5 and 6 at the rear end. These are the typical gases for autogenous welding torches, but other combustibles may be employed. The rear end of the stem containing the inlets is formed for sealing engagement with a torch body 7 containing oxygen and acetylene supply conduits 8 and 9 controlled by valves 10 and 11. The conduits 8 and 9 deliver at the forward or lower end into a socket, in which the rear portion of the stem 3 containing the inlet ports 5 and 6 has removable sealing engagement, being held by a screw-bushing 12.

From the cavity 13 of the block wherein the stem is secured a short passage 14 extends toward the nozzle to deliver the mixture into a longitudinal header-passage 15. Into the bottom of this header-passage or chamber are drilled fine, round, elongated delivery passages 16. There are preferably two adjacent parallel rows of these passages, extended for a substantial distance lengthwise of the seam and spaced apart laterally at a separation greater than the diameter of the individual passages. Fig. 4 illustrates the fact that there may be two smaller header-passages 15ª, one for each row of delivery passages 16 and connected with the cavity 13 by passages 14ª. In Fig. 5 the delivery passages 16ª of the two rows diverge laterally from their inlet to their outlet ends, thereby increasing the spread of the flame. The delivery passages may either lie in vertical transverse planes, as shown in Fig. 1, or be inclined forward or rearward as in Figs. 6 and 7.

The tip is cooled by means of a pair of longitudinal water-passages 17 and 18 extending in the lateral portions of the block, connected at one end by a cross-passage 19 and at the other end communicating with upwardly-extending inlet and outlet passages 20 and 21, to which are fitted suitable external water-conduits 22 and 23. The water thus enters at one end of the block through the conduit 22 and passage 20 and flows in a loop through the passages 17, 19 and 18 back to the exit passage and conduit 21, 23. The gas supply and mixer stem 3 and the cooling connections 22, 23 are preferably located at the remote upper corners of the block, as shown.

Numerous other embodiments may be produced. Figs. 8 and 9 illustrate a tip which delivers jets from a series of short transverse slit orifices 16ᵇ, the flame in this case also being mainly at opposite sides of the center line of the seam. In Figs. 10 and 11 narrow longitudinal slots 16ᶜ are substituted, one for each of the rows of round delivery passages. In order to minimize the consumption and to avoid undue liberation of heat, these slot passages must be very narrow in the transverse direction; but with slots the walls of which are very close together I have experienced great difficulty with back-firing, which difficulty I find can be overcome by causing the walls of each slot to converge gradually at a very gentle taper from the base to a hair-line outlet. This can be accomplished by cutting the slots with parallel walls, and then squeezing the block so that the walls converge, the ends of the slots being filled. Fig. 12 illustrates a torch tip having a single row of delivery passages 16ᵈ in one part and a double row 16ᵉ in the other part, all supplied with the oxyacetylene or like mixture from the mixing provisions. In Fig. 13 laterally-spaced passages 16ᶠ, arranged in pairs, alternate with single central passages 16ᵍ. The tip of Fig. 14 has two rows of delivery passages 16ʰ arranged at a small acute angle lengthwise of the seam.

In using a tip having substantially parallel narrowly spaced rows of ports, or equivalent grouping, with a port or ports at the end occupying a middle course, so that the central jet or jets play upon the metal of the seam fused by the spaced rows of flame, a smoothing or leveling effect is produced.

In prior machine torches for seam welding the aim has been to deliver the mixture of oxygen and combustible gas in such manner as to localize the intense heating as much as possible along a line; whereas the torches and tips of the present invention are constructed for the purpose of establishing a longitudinal zone of confined or accumulated heat which embraces the borders of the seam, this being accomplished by the provision of passages adapted to deliver the mixture in the form of a longitudinally extending, transversely spread collection of fine or narrow jets, spanning the seam. Under these conditions the heating, fusing and uniting of the seam edges take place in a new manner, and the weld is distinguishable from ordinary welds. The weld produced by the line flame is really carried through by the pneumatic action of the gases, while with the present tips this pressure is not directed so much into the crevice, as upon the solid metal at either side, which allows the weld to be produced by radiation and conduction. It is very difficult in mechanical seam welding,—referring particularly to tube-welding,—with a single row of jets to maintain or produce a sufficient section in fusion to weld completely, without having the metal forced through in holes. Very commonly, such welding amounts to melting the upper portions of the edges and driving the material therefrom into the lower part of the crevice. The obtaining of a good welded product requires a very close adjustment and delicate balance of the factors of heat-delivery, conduction, and speed of longitudinal travel, and, of course, alinement. In seam welding performed by torches such as herein disclosed, however, a given point on the open seam as it reaches the forward end of the zone of high temperature and then travels through and past the same, is progressively heated by radiation and conduction inward from both sides, with the result that there is a substantial section of intense heating in the metal, transverse to the seam, which grows wider and deeper until the whole depth is involved in fusion. The region of fusion, being surrounded by the jets and protected by the combined envelope, is not subject to oxidation or to the formation of nitrates from the nitrogen of the air. In the case of tube-welding the envelope gases between the transversely spaced jets flow through the crevice and fill the interior with a reducing atmosphere, which prevents oxidation and consequent weakening of the weld on the inside, so that its interior line comes out bright.

By applying the jets at opposite sides of the seam heat is conducted toward the edges, where it is arrested by the air gap and can only proceed downward, so that the temperature of a large section is raised very rapidly to the fusion point. With the central line of jets, on the other hand, conduction is away from the edges, and as a weld cannot be produced until enough heat has been absorbed by the surrounding metal to lessen subsequent conduction to a point where the continued application of the flame produces a penetrating effect, the progress from first preheating to final welding is much slower than in my case, and the loss of heat greater. Thus, with a double row of jets straddling the seam, of materially less length than a single row that might be used for the same work, and each jet materially smaller, so that the total collection consumes a small amount more of gas per unit time, I am enabled to weld at greatly increased speed of travel through the machine, with corresponding increase in output, and with smaller consumption of gas as measured by the output, obtain a superior product, reduce defective welds from a high to a low percentage, and materially lessen the demand upon the skill and vigilance of the operator.

Heretofore, with the central line of flame, it was difficult to keep the heating on the seam, and weakened welds resulted from slight lateral deviations, which owing to the narrowness of the downwardly tapering heated section caused the seam to be united only at the top or for part of the depth, leaving it open in the interior of the tube. As contrasted with this condition, the present torch makes exact alinement unnecessary, and enables perfect welds to be obtained with less attention and at greater speeds.

What I claim as new is:

1. A machine welding torch for progressively fusing together the edges of seams, having means for forming the mixture of the oxygen and combustible gas, and characterized by a tip for delivering the mixture having preheating and welding jet passages disposed in longitudinally extending transversely spread grouping so as to bring the edges of the seam being welded to fusion by the heat from successive jets applied back from the edges at opposite sides of the seam.

2. A tip for a machine welding torch having passages for delivering the mixture of oxygen and combustible gas disposed in adjacent longitudinal lines so as to span the seam.

3. A burner tip for tube welding, comprising a body with two rows of narrowly spaced ports calculated to deliver jets upon the tube at opposite sides of the seam.

4. A tip for tube welding torches, comprising a body provided with a plurality of ports arranged in two long rows narrowly spaced and calculated to deliver jets at opposite sides of the seam of the tube.

5. A tip for tube welding torches, comprising a body provided with two substantially parallel rows of ports narrowly spaced and calculated to deliver welding jets on opposite sides of the seam of the tube.

6. A tube welding torch, comprising a body provided with a pair of long, narrow, substantially parallel rows of aligned ports calculated to deliver welding jets on opposite sides of the seam of the tube.

7. A tube welding torch tip, comprising a body having ports arranged in two substantially parallel narrowly spaced rows with a port at the end of said two rows spaced from the end thereof but occupying a middle course therebetween.

JAMES L. ANDERSON.